(12) United States Patent
Ostrander et al.

(10) Patent No.: US 6,688,777 B1
(45) Date of Patent: Feb. 10, 2004

(54) BARE FIBER ADAPTOR, FERRULE FOR USE WITH A BARE FIBER ADAPTER, METHOD OF TEMPORARILY CONNECTING THE ENDS OF TWO BARE OPTIC FIBERS, AND KIT FOR USE IN CONNECTION WITH TEMPORARILY COUPLING BARE OPTIC FIBERS

(75) Inventors: Frederick M. Ostrander, Oriskany Falls, NY (US); Carl M. Fredlund, Herkimer, NY (US)

(73) Assignee: NetTest (New York) Inc., Utica, NY (US)

( * ) Notice: Subject to any disclaimer, the term of this patent is extended or adjusted under 35 U.S.C. 154(b) by 176 days.

(21) Appl. No.: 09/964,983

(22) Filed: Sep. 27, 2001

(51) Int. Cl.$^7$ ................................................. G02B 6/38
(52) U.S. Cl. ........................................... 385/70; 385/72
(58) Field of Search .............................. 385/55, 70–75, 385/134, 135, 137, 88–90

(56) References Cited

U.S. PATENT DOCUMENTS

| | | | |
|---|---|---|---|
| 4,622,055 A | | 11/1986 | Mathyssek et al. |
| 4,846,564 A | * | 7/1989 | Caron et al. ................. 385/137 |
| 4,940,307 A | * | 7/1990 | Aberson et al. ............... 385/98 |
| 5,185,843 A | * | 2/1993 | Aberson et al. ............. 385/134 |
| D385,849 S | | 11/1997 | Mathews et al. |
| 5,732,174 A | | 3/1998 | Carpenter et al. |

OTHER PUBLICATIONS

"Fiber–Plus" International website respecting the *Bullet* Bare Fiber Adaptor, No date.

* cited by examiner

Primary Examiner—Son V. Nguyen

(57) ABSTRACT

A ferrule for use with a bare fiber adapter for temporarily coupling the ends of two bare optic fibers. The ferrule includes an elongate body possessing a borehole therethrough, with each of the borehole ends adapted to receive the end of an associated one of the bare optic fibers such that the ends of the bare optic fibers may substantially abut. The elongate body also possesses a slot extending from the periphery of the elongate body to the borehole. A bare fiber adapter incorporating the ferrule is also disclosed. A method of temporarily connecting the ends of two bare optic fibers is disclosed, and a kit for use in temporarily coupling unterminated optic fiber to test instrumentation is also disclosed.

53 Claims, 9 Drawing Sheets

BARE FIBER ADAPTOR, FERRULE FOR USE WITH A BARE FIBER ADAPTER, METHOD OF TEMPORARILY CONNECTING THE ENDS OF TWO BARE OPTIC FIBERS, AND KIT FOR USE IN CONNECTION WITH TEMPORARILY COUPLING BARE OPTIC FIBERS

BACKGROUND OF THE INVENTION

The present invention relates generally to fiber optic technology.

It is often desirable to couple unterminated optic fiber to test instrumentation, such as an optical time domain reflectometer or an optical spectrum analyzer. Such coupling is fraught with difficulty. The light-carrying inner core of an optic fiber is typically as small as 9 micrometers in diameter and is delicate to handle. The core of the unterminated optic fiber must be temporarily aligned and substantially abutted with the core in the end of a second optic fiber in communication with the test equipment. The cores must be maintained in such a position during the test procedures, and then must be disconnected so that similar tests may be conducted on other optic fibers.

SUMMARY OF THE INVENTION

The present invention relates to a ferrule for use with a bare fiber adapter for temporarily coupling the ends of two bare optic fibers. The ferrule includes an elongate body possessing a borehole therethrough, with each of the borehole ends adapted to receive the end of an associated one of the bare optic fibers such that the ends of the bare optic fibers may substantially abut. The elongate body also possesses a slot extending from the periphery of the elongate body to the borehole. A bare fiber adaptor incorporating the ferrule is also disclosed. A method of temporarily connecting the ends of two bare optic fibers is disclosed, and a kit for use in temporarily coupling unterminated optic fiber to test instrumentation is also disclosed.

BRIEF DESCRIPTION OF THE DRAWING

The invention will be described with reference to the accompanying drawings, wherein.

DESCRIPTION OF A PREFERRED EMBODIMENT OF THE INVENTION

The following description of a preferred embodiment is for the purpose of explanation, and not limitation. Some specific details are set forth in order to provide a better understanding of a preferred embodiment of the present invention, however, in other instances, description of other elements, features, and techniques are omitted so as not to encumber or confuse the reader with unnecessary detail. It will be apparent to one skilled in the art that the present invention may be practiced in other embodiments that depart from the following description and that differences may exist from the embodiment specifically described without departing from the spirit and scope of the present invention. The following detailed description is therefore not to be taken in a limiting sense.

Figure 1:
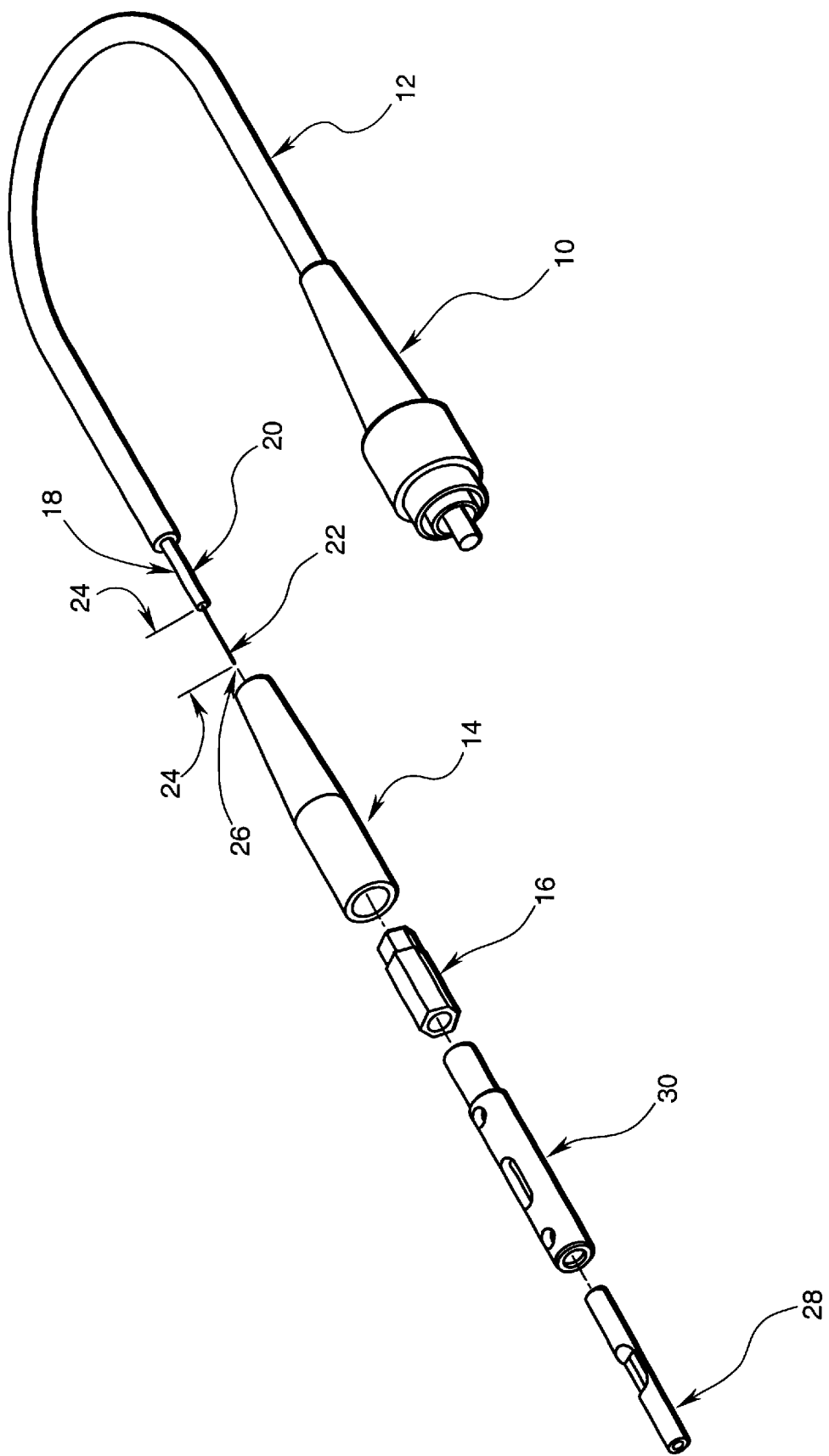
FIG. 1 is a perspective, partially exploded view of a conventional pigtal adapted for implementation with the ferrule.

As shown in FIG. 1 a pigtail 12 may include a conventional connector 10, which preferably includes, but is not limited to, a FC, ST, or SC style. The connector 10 may be coupled to an optical device such as a light source, a power measurement meter, an optical time domain reflectometer, or an optical spectrum analyzer, in a well-known manner. The pigtail 12 further includes a conventional boot 14, such as the Coming (ST) 25-100-02 boot, and includes a conventional crimp 16 adapted to be disposed within the boot 14, such as the Corning (ST) 95-100-02 crimp. Within the pigtail is an optic fiber 18, which conventionally includes a central core that carries light, an intermediate cladding layer, which serves to confine the light to the core, and an outer buffer layer 20 which serves as a shock absorber to protect the core and cladding from damage. An optic fiber preferably of any commercial communications type may be employed. As shown in FIG. 1, a distance 24 of the buffer is removed from the end of the optic fiber, leaving a so-called "bare" optic fiber that is adapted to be inserted through and disposed within the boot 14 and the crimp 16. Also preferably the tip or end 26 of the optic fiber is cleaved and then finished preferably using an arc fusion process to clean, rather than fuse, the fiber end.

The present invention contemplates that a ferrule 28 is utilized to temporarily couple the ends of two bare optic fibers, one of which is preferably the optic fiber 18 within the pigtail. The ferrule 28 is preferably cylindrical in configuration with an outer diameter preferably about 2.0 to 3.0 millimeters and most preferably 2.5 millimeters.

The ferrule 28 includes the borehole centrally, axially extending therethrough with a diameter preferably matching the outer diameter of the cladding of the optic fiber, and even more preferably about 0.5 to 3.0 micrometers larger than the diameter of the cladding of the optic fibers to be coupled. Preferably, the bare optic fiber (without the buffer) will be snugly received within the borehole, without wobble. The ferrule 28 is preferably fashioned of a borosillicate glass, but may be fashioned of other types of glass, metal, or even ceramics. Preferably the ferrule 28 possesses a length in the range of about one-half inch to one and one-quarter inches, and most preferably about one inch.

Figure 4:
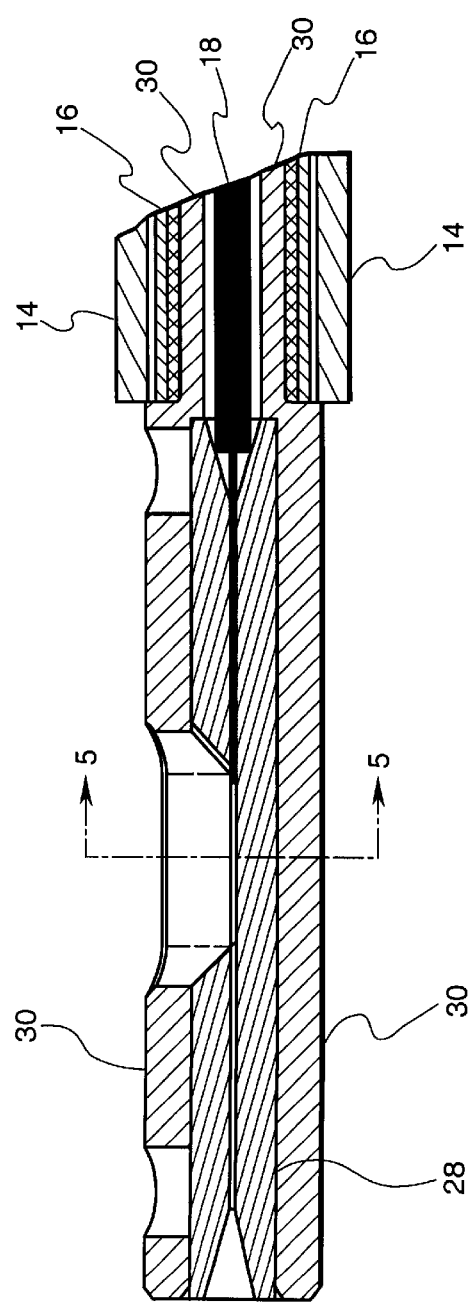
FIG. 4 is a cross-sectional view of a portion of the ferrule as attached to a pigtail, taken along the line 4—4 shown in FIG. 2.

The ferrule 28 also possesses a preferably substantially oval slot preferably centrally positioned between the longitudinal ends of the ferrule 28, which slot extends from the periphery of the ferrule 28 to the borehole. Preferably the slot extends for a length equal to about one-quarter of the length of the ferrule 28. As best shown in FIG. 1 and FIG. 4, the slot essentially bisects the ferrule 28, with each end face defining the slot being angled or sloped, as best shown in FIG. 1. Each longitudinal end of the ferrule 28 is preferably concave, and more preferably conically recessed, as best shown in FIG. 4, so that bare optic fiber may be guided into each end of the ferrule 28 and further into the borehole.

The present invention contemplates that a flange 30 will preferably permanently receive the ferrule 28 and will be permanently attached to the crimp 16. The flange 30 generally possesses a cylindrical configuration and includes a central, hollow, cylindrical borehole adapted to snugly receive the ferrule 28. One longitudinal end of the flange 30 is adapted to function as a nipple that extends into the crimp 16 and to be secured thereto. The flange 30 includes a central, elongate opening generally corresponding in configuration with the slot in the ferrule 28, whereby the borehole in the region of the slot in the ferrule 28 may communicate with the exterior of the flange 30. The flange 30 also includes a pair of circular apertures radially extending to the hollow interior. In accordance with the preferred embodiment of the invention, the ferrule 28 is inserted into the flange 30 and an epoxy is placed within each of the pair of apertures in the flange 30 so that the ferrule 28 is permanently glued or fixed to the flange 30 such that the slot in the ferrule 28 is centered and disposed beneath the central, elongate opening in the flange 30, as best shown in FIG. 4.

Figure 2:
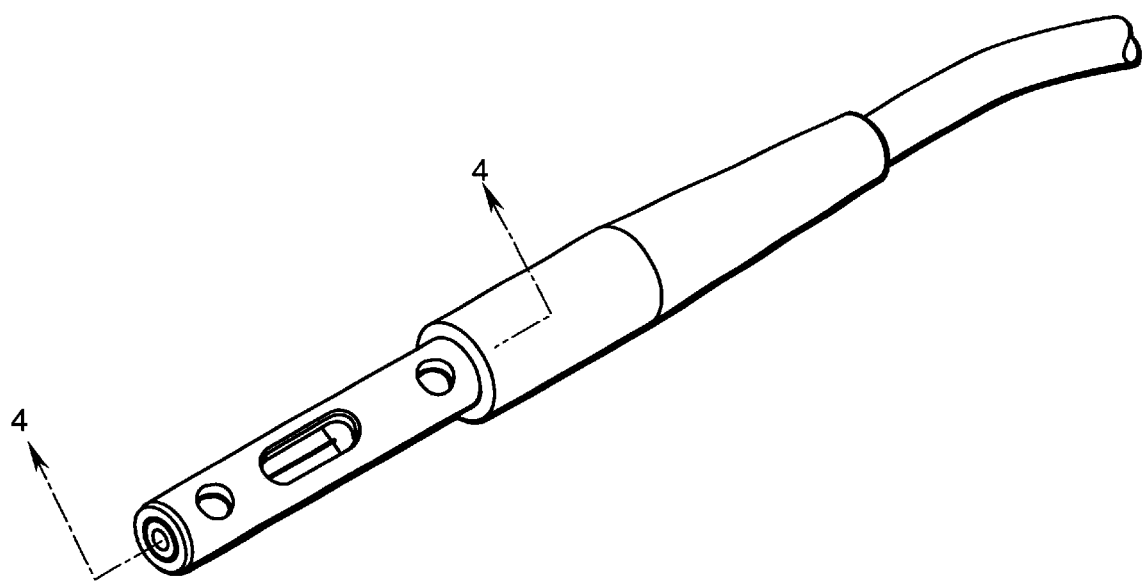
FIG. 2 is a perspective view of a portion of the pigtail shown in FIG. 1 with the ferrule attached.
Figure 3:
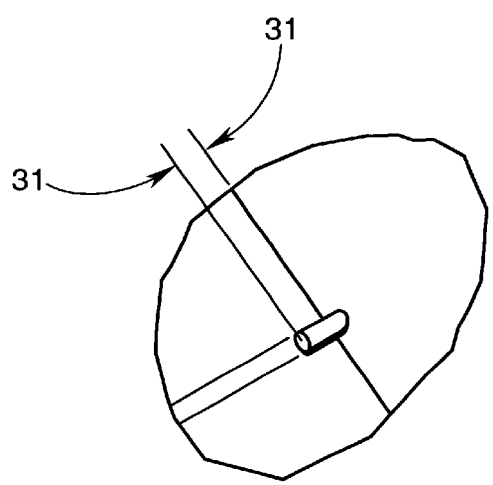
FIG. 3 is an enlarged view of a schematic illustration of an end of a bare optic fiber extending into a slotted region of the ferrule.
Figure 5:
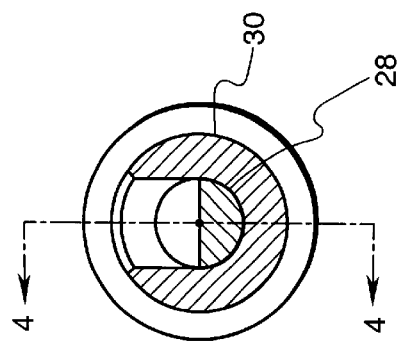
FIG. 5 is a cross-sectional view of the ferrule as connected to the pigtail taken along the line 5—5 shown in FIG. 4.

The distal end of the bare optic fiber in the pigtail is inserted through the boot 14 and the crimp 16 such that the tip or end extends through the borehole into the region of the slot, as best shown in FIGS. 2–4. Most preferably, the tip extends into the slot a distance 31 preferably in the range of about 0.03 to 1.0 millimeters, and most preferably about 0.5 millimeters. Such a small extension distance helps minimize the potential for damage to the bare optic fiber. In this position, preferably the buffer surrounding the optic fiber of the pigtail extends into the conical recess in the end of the ferrule 28, as best shown in FIG. 4. An epoxy is placed in the conical recess around the optic fiber so that the optic fiber is glued and permanently affixed to the ferrule 28, such that the tip or end of the bare optic fiber is permanently maintained at the selected position extending in the borehole and into the slot of the ferrule 28, again as best shown in FIG. 4.

In order to temporarily couple the end of an unterminated optic fiber, the bare optic fiber is inserted into the other end of the ferrule 28, or the lefthand side of the ferrule 28 as shown in FIG. 4. Again, preferably, the tip or end of the bare optic fiber in the unterminated optic fiber is prepared according to standard practices prior to being inserted into the ferrule 28. The bare optic fiber is inserted through the borehole until the tip or end of the bare optic fiber substantially abuts the tip or end of the optic fiber extending into the ferrule 28 from the pigtail. Even when the tips or ends of the opposing bare optic fibers are substantially abutting, the interface may cause reflections and other distortions of light passing from one fiber to the other fiber. These distortions may cause power loss or other signal irregularities that detract from testing analysis. Therefore, the present invention contemplates that an index matching oil or an immersion liquid may be applied in the region where the opposing bare optic fibers abut. The material may be a gel or liquid and preferably possesses an index of refraction that is essentially identical to the index of refraction of both of the core materials of the opposing optic fibers. The use of such a gel or liquid helps minimize reflections and other distortions in light transmitted between the fibers. It will be appreciated that the slot in the ferrule 28 and the opening in the flange 30 permits the gel or liquid to be applied (and to be re-applied) to the region where the opposing optic fibers abut.

The method of temporarily coupling the two fibers according to the present invention preferably results in a power loss of less than 1 dB when light is transmitted from one fiber to the other.

Figure 6:
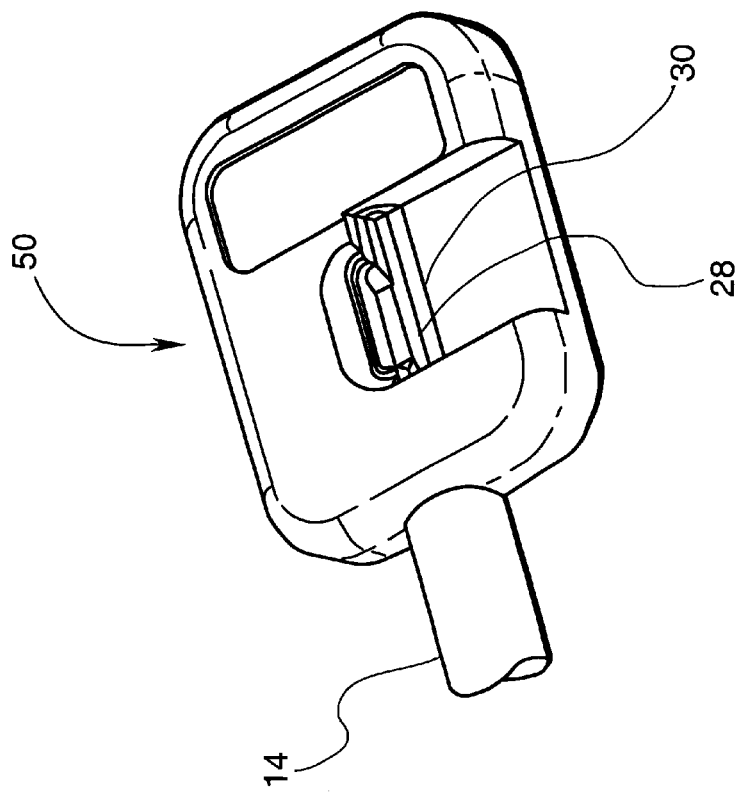
FIG. 6 is a perspective, partially cut-away view of the housing or mounting block of the bare fiber adaptor adapted to receive the ferrule.
Figure 9:
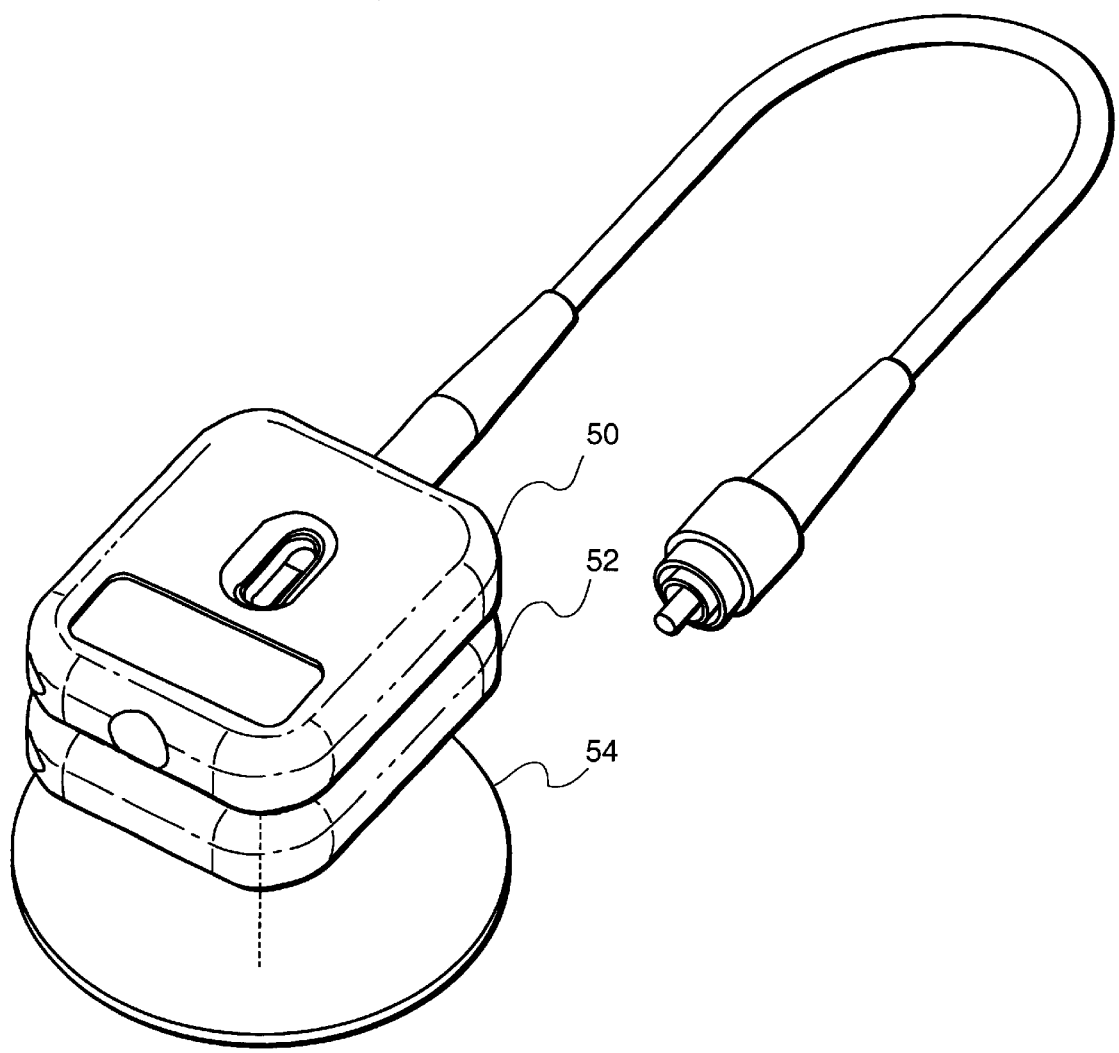
FIG. 9 is a perspective illustration of the pigtail and ferrule assembly shown in FIG. 1 with the ferrule received in the housing shown in FIG. 6 with the auxiliary housing as shown in FIG. 8.
Figure 11:
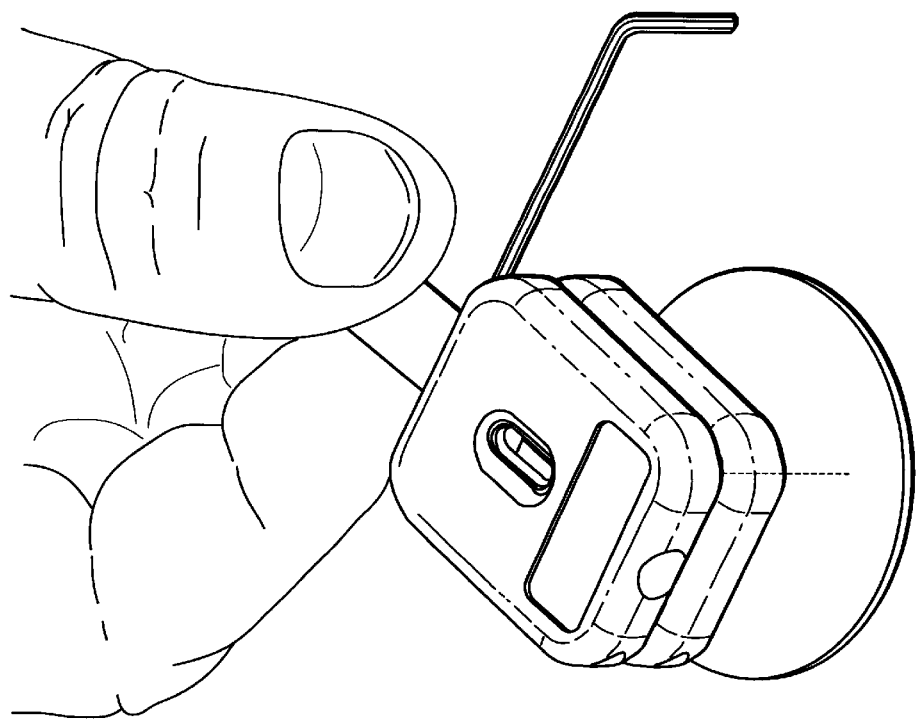
FIG. 11 is a perspective illustration of how the pigtail with the attached ferrule may be selectively inserted into and retracted from the housing and auxiliary housing depicted in a portion of FIG. 9.
Figure 10:
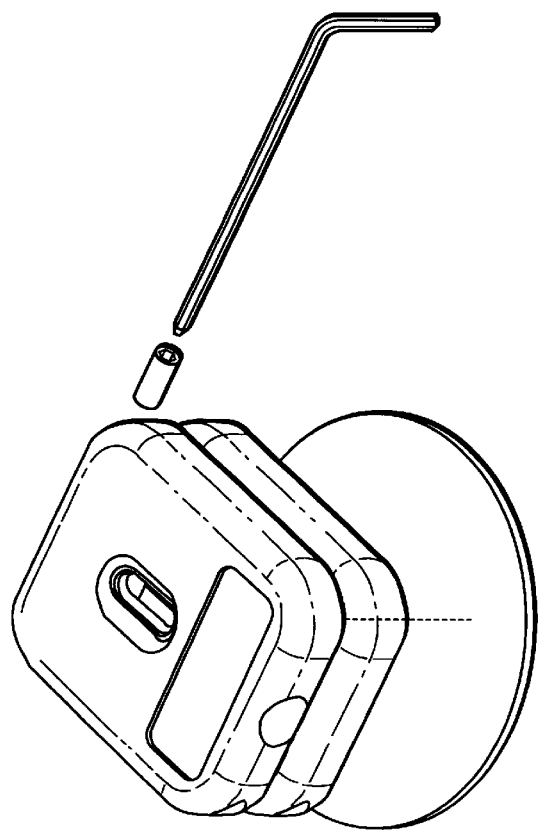
FIG. 10 is a perspective illustration of the housing shown in FIG. 6 illustrating the use of an Allen wrench and a set screw to selectively maintain the ferrule within the housing.

It should be appreciated that it is difficult to maintain the opposing optic fibers in a position of abutment and to keep the bare optic fiber from breaking or snapping during the process of coupling and uncoupling the unterminated optic fiber within the ferrule 28. Accordingly, the present invention contemplates the use of a mounting base or housing 50, as best shown in FIG. 6. The housing 50 is fashioned of a substantially rectangular shaped plate of metal. The housing 50 includes a substantially oval slot extending through to the interior hole, the shape of which generally conforms with the slot in the ferrule 28 and the elongate opening in the flange 30. A hole extends from one end to the opposing end of the housing 50, with one end of the hole having a diameter substantially equal to the outer diameter of the flange 30 and adapted to receive the flange 30, and the other end of the hole having a diameter slightly larger than the cladding of the unterminated bare optic fiber. The longitudinal end of the hole adapted to receive the unterminated bare fiber optic (i.e., the input port end) may have a concave surface, and preferably a conical recession, so as to guide the unterminated bare optic fiber into the housing 50, and further into the ferrule 28, as best shown in FIGS. 6 and 9. The flange 30 (and the ferrule 28 fixed therein) are selectively secured within the housing 50 by means of a set screw as best shown in FIG. 10 such that the slot of the ferrule 28 and the opening of the flange 30 are disposed beneath the slot of the housing 50.

Figure 7:
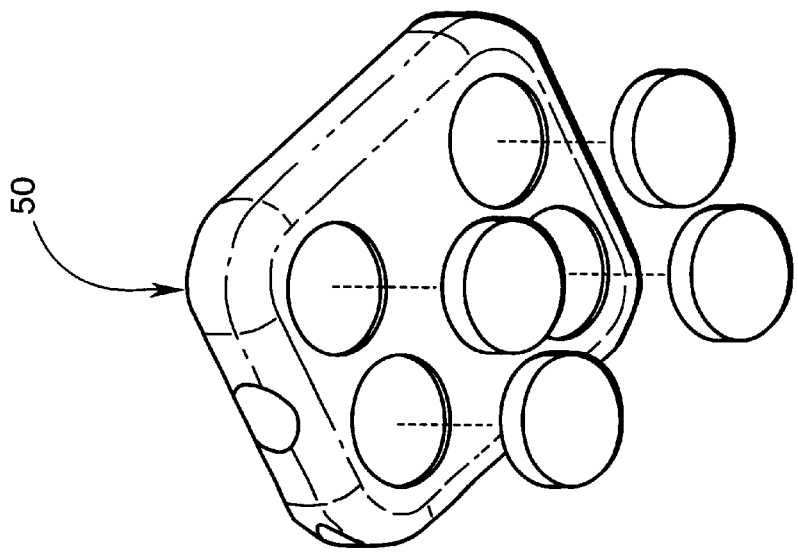
FIG. 7 is a perspective, partially exploded view of the housing shown in FIG. 6.

In order to prevent the housing 50 from inadvertently moving during the coupling and uncoupling process, the housing 50 may be provided with four circular magnets affixed to one surface thereof by glue or the like, as best shown in FIG. 7. As such, the housing 50 may be selectively attached to a metal surface.

Figure 8:
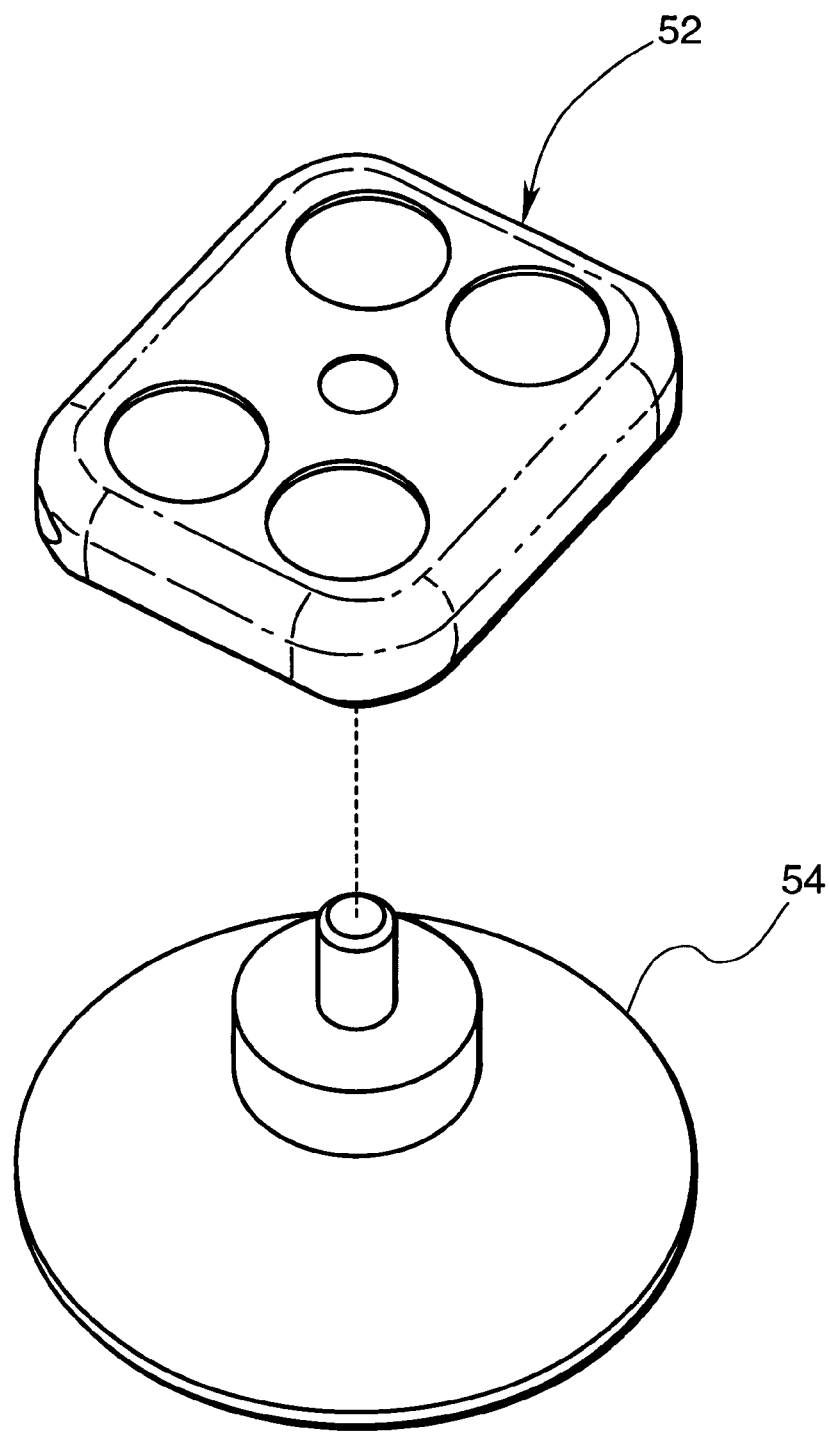
FIG. 8 is a perspective, partially exploded view of an auxiliary section of the housing shown in FIG. 6.

The present invention also contemplates that an auxiliary housing 52 generally fashioned of a rectangular shaped metal plate may be secured to the housing 50. As best shown in FIG. 8, the auxiliary housing 52 may possess a series of four circular recessions adapted to receive corresponding ones of the circular magnets that are preferably attached to the housing 50, as best shown in FIG. 7. Thus, the auxiliary housing 52 may be selectively secured to or may be permanently secured to the housing 50. The auxiliary housing 52 includes a central aperture adapted to receive the nipple portion of a suction cup 54, as best shown in FIG. 8. By using auxiliary housing 52 and the associated suction cup 54, the housing 50 may selectively mounted on a table top or other work surface, again, whereby the housing 50 is maintained in a selected position during the coupling and uncoupling operation.

Dust and other debris may collect in the slot and in the borehole of the ferrule 28. The present invention contemplates that the borehole in the slot region of the ferrule 28 may be cleaned by utilizing a can of pressurized gas with a spray nozzle and by applying a few blasts of gas directed into the rear of the slot (away from the permanently affixed pigtail bare optic fiber). Alternatively, isopropyl alcohol may be applied in the slot and may be brushed to spread throughout the region of the slot. After the alcohol has substantially evaporated, a can of pressurized gas may be applied in the manner previously described.

Figure 13:
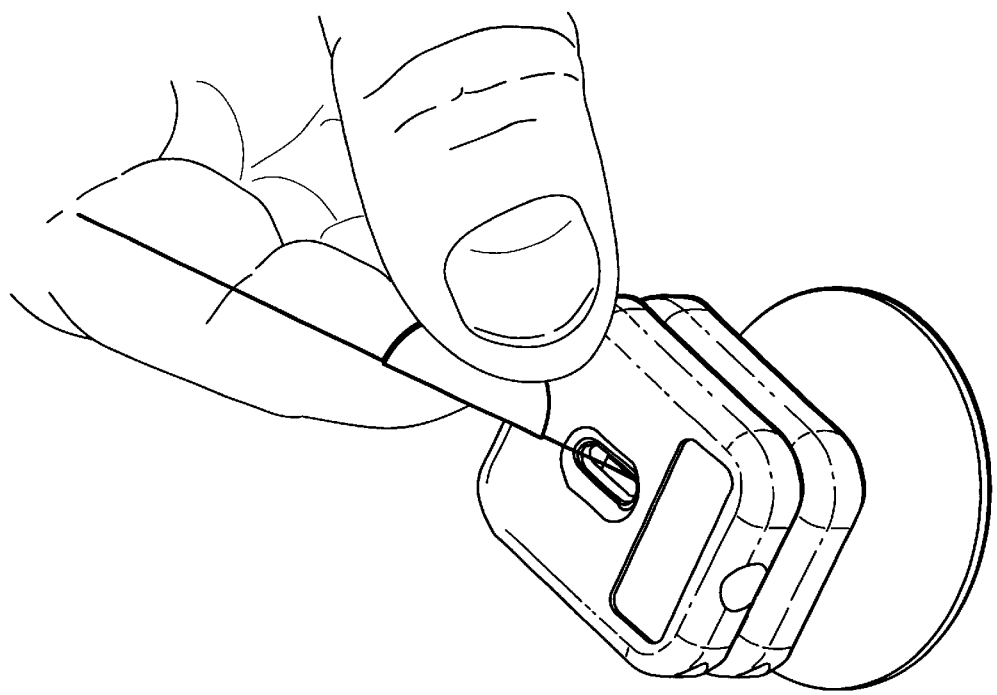
FIG. 13 is a perspective illustration showing how the implement shown in FIG. 12 may be used in connection with the housing shown in FIG. 6.
Figure 12:
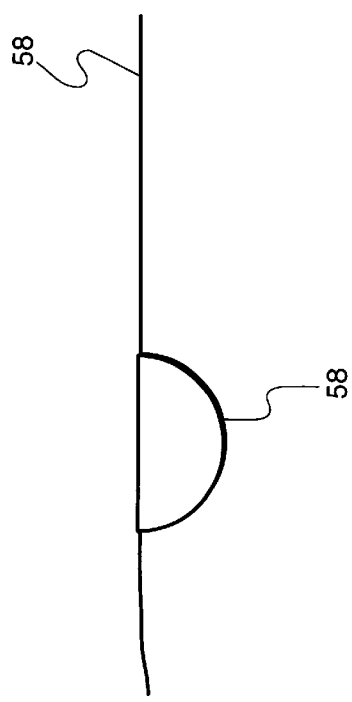
FIG. 12 is a side view of an implement that may be used to clear the ferrule of broken fiber and other debris.
Figure 14:
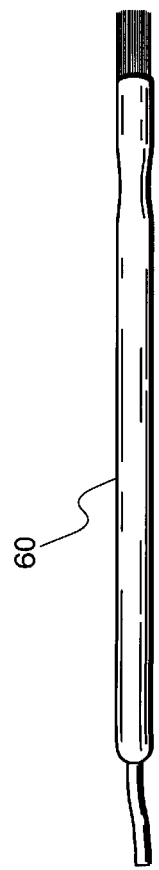
FIG. 14 is a perspective view of another implement that may be used to clear broken fiber from the ferrule.
Figure 15:
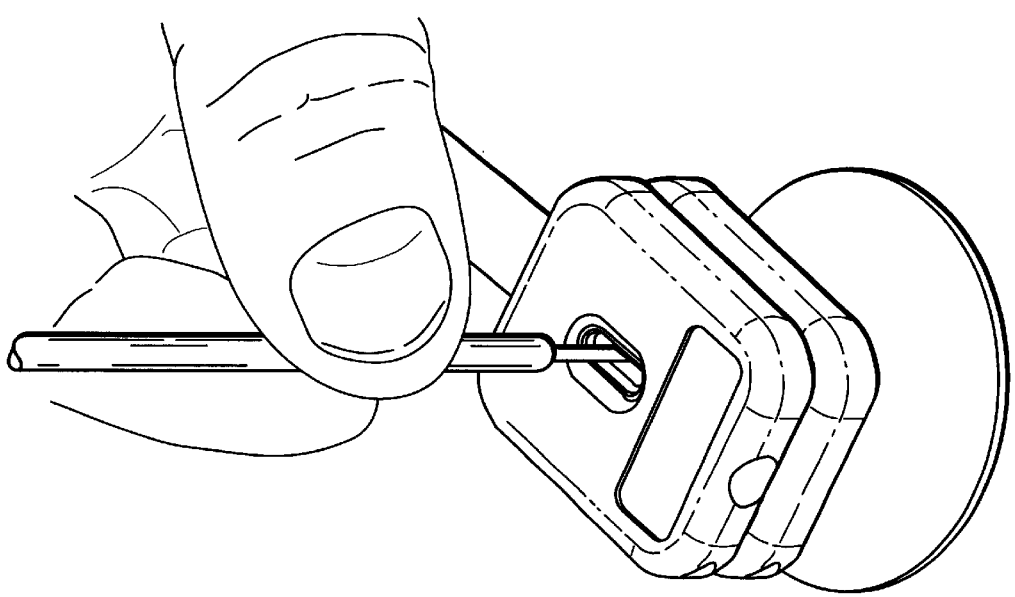
FIG. 15 is a perspective illustration showing how the implement shown in FIG. 14 may be used in connection with the housing shown in FIG. 6.

There is shown in FIG. 14 a utensil 60 that may be used to clean the ferrule 28 of broken fiber in the borehole in the vicinity of the slot in the ferrule 28. The utensil 60 includes a rod having a series of nylon bristles attached to one end thereof, and a pick attached to the other end thereof. The pick preferably possesses a relatively thin, cupped tip. The pick may be inserted into the elongate opening in the housing 50 in a generally perpendicular orientation, such that the tip of the pick abuts the bottom of the slot at the end of the slot nearest to the pigtail boot as best shown in FIG. 15. Light, downward pressure is applied on the implement and the pick is pushed toward the input port end of the slot opening. As an additional or alternate method of cleaning broken fiber from the slot of the ferrule 28, a segment of wire 58, such as piano wire, having a diameter approximately equal to and preferably slightly smaller than the diameter of the borehole in the ferrule 28, may be utilized. A segment of adhesive tape 59 or the like may be folded over the wire 58 to provide a tab for manual gripping, as best shown in FIG. 12. The end of the wire 58 may then be inserted into the borehole at the end of the slot in the ferrule 28 nearest to the pigtail boot and then moved along the borehole toward the input port, in the manner as shown in FIG. 13.

Figure 16:
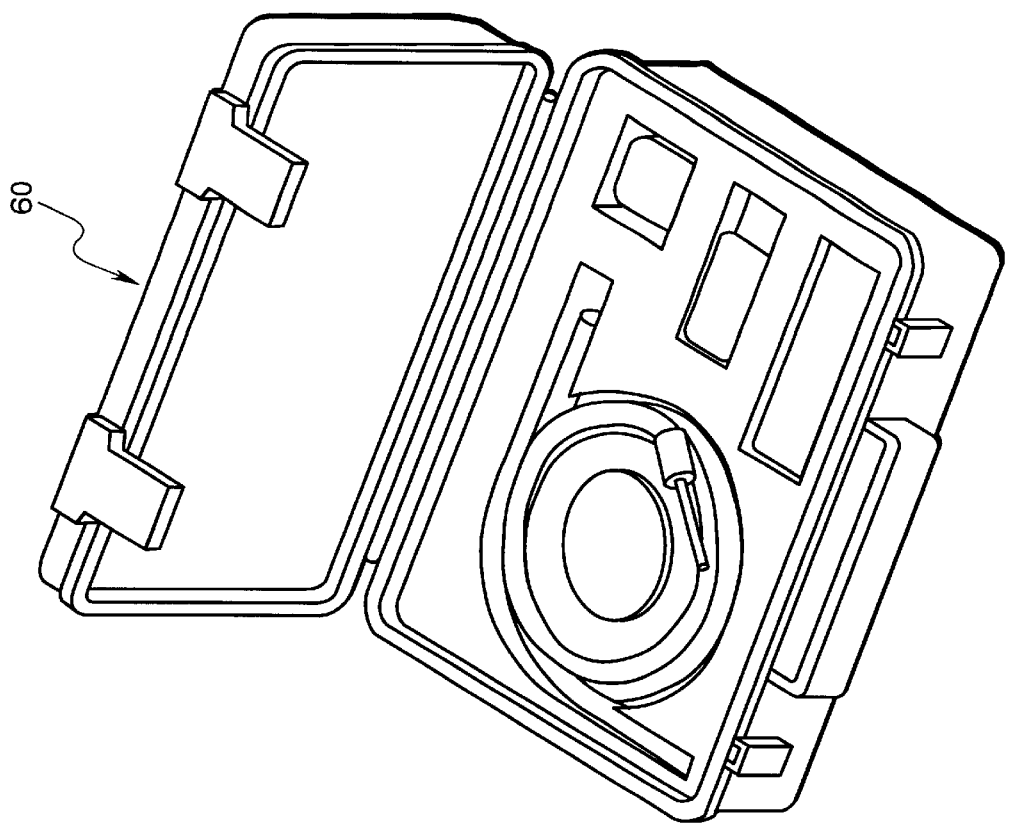
FIG. 16 is a perspective illustration of a kit that may be used for temporarily coupling the unterminated optic fiber to an optical test device.

The present invention also contemplates that various devices useful in connection with various aspects of the present invention may be contained in a box or kit, as best shown in FIG. 16. The kit includes the pigtail with the attached flange 30 and ferrule 28, a the housing 50 (optionally with the auxiliary housing 52), a container containing matching index of refraction fluid, the utensil 60 with the brush and pick, and a container containing wire such as piano wire. In addition, the kit may contain a can of pressurized gas and may include a container of isopropyl alcohol.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A connector for temporarily coupling two optic fibers, each fiber having at least one associated bare terminal end, comprising:

a pigtail including an associated one of said optic fibers, a boot through which said associated optic fiber extends, and a crimp possessing two longitudinal ends and disposed within said boot and through which said associated optic fiber extends, said bare terminal end of said associated optic fiber extending past the first one of said longitudinal ends of said crimp, through said crimp, and beyond the second one of said longitudinal ends of said crimp;

a flange possessing a substantially cylindrical interior cavity and possessing two longitudinal ends each having apertures in communication with said interior cavity, said flange possessing a nipple section disposed within said crimp through said second one of said longitudinal ends of said crimp, said crimp provided with a slot extending from said interior cavity to the peripheral exterior of said flange;

an elongate body possessing a borehole therethrough such that two borehole ends are created, and possessing at least one slot extending from said borehole to the peripheral exterior of said elongate body, said elongate body disposed within said interior cavity of said flange such that said slot in said flange and said at least one slot in said elongate body substantially overlap, each of said borehole ends adapted to receive said at least one associated bare terminal end of an associated one of said optic fibers such that said at least one associated bare terminal ends of said optic fibers may substantially abut at a location interiorly between said borehole ends in the region of said at least one slot in said elongate body; and means for substantially permanently securing said elongate body to said flange.

2. The connector according to claim 1 wherein said elongate body is fashioned of a single piece of unitary material selected from the group consisting of glass, metal, and ceramic.

3. The connector according to claim 2 wherein said elongate body possesses a substantially cylindrical periphery having a pair of longitudinal ends and wherein said borehole possesses a substantially cylindrical configuration and is substantially axially aligned within said elongate body and wherein each said borehole end is located at an associated one of the longitudinal ends of said elongate body.

4. The connector according to claim 3 wherein said at least one slot in said elongate body is disposed substantially midway between said borehole ends.

5. The connector according to claim 4 wherein said elongate body possesses a length in the range of about one-half inch to one and one-quarter inches and an outer diameter in the range of about 2.0 to 3.0 millimeters and wherein said at least one slot in said elongate body extends about one-quarter of the length of said elongate body.

6. The connector according to claim 3 wherein said elongate body possesses a concave face at each longitudinal end thereof whereby said at least one associated bare terminal end of each optic fiber maybe funneled into an associated one of said borehole ends associated with said longitudinal ends of said elongate body.

7. The connector according to claim 6 wherein each said concave face is substantially conical.

8. The connector according to claim 3 wherein said borehole possesses a diameter in the range of about 0.5 to 3.0 microns larger than the diameter of said at least one bare terminal end of each optic fiber.

9. The connector according to claim 1 further comprising housing means adapted to receive said flange and said elongate body for inhibiting movement of said flange and said elongate body.

10. The connector according to claim 9 further comprising means for selectively securing said flange and said elongate body to said housing means.

11. The connector according to claim 9 further comprising means for selectively securing said housing means to a work surface.

12. The connector according to claim 10 further comprising means for selectively securing said housing means to a work surface.

13. The connector according to claim 11 wherein said means for selectively securing said housing means is selected from the group consisting of a magnet and a suction cup.

14. The connector according to claim 12 wherein said means for selectively securing said housing means is selected from the group consisting of a magnet and a suction cup.

15. A connector for temporarily coupling two optic fibers, each fiber having at least one associated bare terminal end, consisting essentially of:
   a pigtail including an associated one of said optic fibers, a boot through which said associated optic fiber extends, and a crimp possessing two longitudinal ends and disposed within said boot and through which said associated optic fiber extends, said bare terminal end of said associated optic fiber extending past the first one of said longitudinal ends of said crimp, through said crimp, and beyond the second one of said longitudinal ends of said crimp;
   a flange possessing a substantially cylindrical interior cavity and possessing two longitudinal ends each having apertures in communication with said interior cavity, said flange possessing a nipple section disposed within said crimp through said second one of said longitudinal ends of said crimp, said crimp provided with a slot extending from said interior cavity to the peripheral exterior of said flange;
   an elongate body possessing a borehole therethrough such that two borehole ends are created, and possessing at least one slot extending from said borehole to the peripheral exterior of said elongate body, said elongate body disposed within said interior cavity of said flange such that said slot in said flange and said at least one slot in said elongate body substantially overlap, each of said borehole ends adapted to receive said at least one associated bare terminal end of an associated one of said optic fibers such that said at least one associated bare terminal end of said optic fibers may substantially abut at a location interiorly between said borehole ends in the region of said at least one slot in said elongate body; and
   means for substantially permanently securing said elongate body to said flange.

16. The connector according to claim 15 wherein said elongate body is fashioned of a single piece of unitary material selected from the group consisting of glass, metal, and ceramic.

17. The connector according to claim 16 wherein said elongate body possesses a substantially cylindrical periphery having a pair of longitudinal ends and wherein said borehole possesses a substantially cylindrical configuration and is substantially axially aligned within said elongate body and wherein each said borehole end is located at an associated one of the longitudinal ends of said elongate body.

18. The connector according to claim 17 wherein said at least one slot in said elongate body is disposed substantially midway between said borehole ends.

19. The connector according to claim 18 wherein said elongate body possesses a length in the range of about one-half inch to one and one-quarter inches and an outer diameter in the range of about 2.0 to 3.0 millimeters and wherein said at least one slot in said elongate body extends about one-quarter of the length of said elongate body.

20. The connector according to claim 17 wherein said elongate body possesses a concave face at each longitudinal end thereof whereby said at lest one associated bare terminal end of each optic fiber may be funneled into an associated one of said borehole ends associated with said longitudinal ends of said elongate body.

21. The connector according to claim 20 wherein each said concave face is substantially conical.

22. The connector according to claim 17 wherein said borehole possesses a diameter in the range of about 0.5 to 3.0 microns larger than the diameter of said at least one bare terminal end of each optic fiber.

23. The connector according to claim 15 further consisting essentially of housing means adapted to receive said flange and said elongate body for inhibiting movement of said flange and said elongate body.

24. The connector according to claim 23 further consisting essentially of means for selectively securing said flange and said elongate body to said housing means.

25. The connector according to claim 23 further consisting essentially of means for selectively securing said housing means to a work surface.

26. The connector according to claim 25 further consisting essentially of means for selectively securing said housing means to a work surface.

27. The connector according to claim 25 wherein said means for selectively securing said housing means is selected from the group consisting of a magnet and a suction cup.

28. The connector according to claim 26 wherein said means for selectively securing said housing means is selected from the group consisting of a magnet and a suction cup.

29. A connector for temporarily coupling two bare optic fibers, each optic fiber having at least one associated bare terminal end, comprising:
   a pigtail including an associated one of said optic fibers, a boot through which said associated optic fiber extends, and a crimp possessing two longitudinal ends and disposed within said boot and through which said associated optic fiber extends, said bare terminal end of said associated optic fiber extending past the first one of said longitudinal ends of said crimp;
   an elongate body possessing a borehole therethrough such that two borehole ends are created and possessing at least one slot extending from said borehole to the peripheral exterior of said elongate body, each of said borehole ends adapted to receive said at least one bare terminal end of an associated one of said optic fibers such that said at least one bare terminal ends of said optic fibers may substantially abut at a location interiorly between said borehole ends in the region of said at least one slot; and
   flange means for securing said elongate body to said crimp.

30. The connector according to claim 29 further comprising housing means adapted to receive said flange means and said elongate body for inhibiting movement of said flange means and said elongate body.

31. The connector according to claim 30 further comprising means for selectively securing said flange means and said elongate body to said housing means.

32. The connector according to claim 30 further comprising means for selectively securing said housing means to a work surface.

33. The connector according to claim 31 further comprising means for selectively securing said housing means to a work surface.

34. The connector according to claim 32 wherein said means for selectively securing said housing means is selected from the group consisting of a magnet and a suction cup.

35. The connector according to claim 33 wherein said means for selectively securing said housing means is selected from the group consisting of a magnet and a suction cup.

36. A connector for temporarily coupling two bare optic fibers, each optic fiber having at least one associated bare terminal end, comprising essentially of:

a pigtail including an associated one of said optic fibers, a boot through which said associated optic fiber extends, and a crimp possessing two longitudinal ends and disposed within said boot and through which said associated optic fiber extends, said bare terminal end of said associated optic fiber extending past the first one of said longitudinal ends of said crimp;

an elongate body possessing a borehole therethrough such that two borehole ends are created and possessing at least one slot extending from said borehole to the peripheral exterior of said elongate body, each of said borehole ends adapted to receive said at least one bare terminal end of an associated one of said optic fibers such that said at least one bare terminal ends of said optic fibers may substantially abut at a location interiorly between said borehole ends in the region of said at least one slot; and flange means for securing said elongate body to said crimp.

37. The connector according to claim 36 further consisting essentially of housing means adapted to receive said flange means and said elongate body for inhibiting movement of said flange means and said elongate body.

38. The connector according to claim 37 further consisting essentially of means for selectively securing said flange means and said elongate body to said housing means.

39. The connector according to claim 37 further consisting essentially of means for selectively securing said housing means to a work surface.

40. The connector according to claim 38 further consisting essentially of means for selectively securing said housing means to a work surface.

41. The connector according to claim 39 wherein said means for selectively securing said housing means is selected from the group consisting of a magnet and a suction cup.

42. The connector according to claim 40 wherein said means for selectively securing said housing means is selected from the group consisting of a magnet and a suction cup.

43. A kit for use in connection with temporarily coupling a first optic fiber having at least one associated bare terminal end to an optical device such as an optical time domain reflectometer or an optical spectrum analyzer, said kit including:

a pigtail, one end of which is adapted to be releasably connected to said optical device and the other end of which includes a ferrule and a second optic fiber having a core and having at least one associated bare terminal end substantially permanently affixed to said ferrule, said ferrule comprising a substantially cylindrical body possessing a pair of longitudinal ends, possessing a substantially cylindrical borehole substantially axially therethrough such that a borehole end is disposed in an associated one of said longitudinal ends of said body, one of said borehole ends adapted to substantially permanently receive a first bare terminal end of said second optic fiber and the other borehole end adapted to selectively receive a first bare terminal end of said first optic fiber such that the first bare terminal ends of said first and second optic fibers may substantially abut, and possessing at least one slot extending from the periphery of said body to said borehole;

a container containing a material selected from the group consisting of gel and liquid, said material having an index of refraction substantially equal to the index of refraction of the core portion of said second optic fiber; and means for cleaning said borehole in the region of said slot.

44. The kit according to claim 43 wherein said cleaning means includes a container containing compressed gas.

45. The kit according to claim 43 wherein said cleaning means includes a brush and a pick.

46. The kit according to claim 43 wherein said cleaning means includes a wire having a diameter slightly small than the diameter of said borehole.

47. A method of temporarily connecting first and second optic fibers, each fiber having at least one associated bare terminal end, comprising the steps of:

(a) providing a pigtail, one end of which is adapted to be releasably connected to said optical device such as an optical time domain reflectometer or an optical spectrum analyzer and the other end of which includes a ferrule and a second optic fiber having a core and having at least one associated bare terminal end substantially permanently affixed to said ferrule, said ferrule comprising a substantially cylindrical body possessing a pair of longitudinal ends, possessing a substantially cylindrical borehole substantially axially therethrough such that a borehole end is disposed in an associated one of said longitudinal ends of said body, one of said borehole ends adapted to substantially permanently receive a first bare terminal end of second optic fiber and the other borehole end adapted to selectively receive a first bare terminal end of said first optic fiber such that the first bare terminal ends of said first and second optic fibers may substantially abut, and possessing at least one slot extending from the periphery of said body to said borehole;

(b) providing means for cleaning said borehole in the region of said at least one slot;

(c) cleaning said borehole in the region of said at least one slot utilizing said cleaning means;

(d) inserting the first bare terminal end of said first optic fiber into said borehole end adapted to receive said first bare terminal end of said first optic fiber and substantially maintaining said first bare terminal end of said first optic fiber in a position substantially abutting said first bare terminal end of said second optic fiber extending into said borehole in the region of said at least one slot.

48. The method of claim 47 further comprising the steps of depositing through said slot and into said borehole a material selected from the group consisting of gel and liquid, said material having an index of refraction substantially equal to the index of refraction of the core portion of said second optic fiber.

49. The method of claim 47 wherein said method results in less than about 1.0 decibels of power loss when light is transmitted from one fiber to the other fiber.

50. The method of claim 48 wherein said method results in less than about 1.0 decibels of power loss when light is transmitted from one fiber to the other fiber.

51. A method of temporarily connecting at least two remote optic fibers, each fiber having at least one associated bare terminal end, to an optical device such as an optical time domain reflectometer and an optical spectrum analyzer, said method comprising the steps of:

(a) providing a pigtail including a pigtail optic fiber having a core and having at least one associated bare terminal end and including a ferrule, one end of said pigtail adapted to be releasably connected to said optical device and the other end of said pigtail possessing said ferrule, at least one associated bare terminal end of said pigtail optic fiber substantially permanently affixed to said ferrule, said ferrule comprising a substantially cylindrical body possessing a pair of longitudinal ends, possessing a substantially cylindrical borehole substantially axially therethrough such that a borehole end is disposed in an associated one of said longitudinal ends of said body, one of said borehole ends adapted to substantially permanently receive a first bare terminal end of said pigtail optic fiber and the other borehole end adapted to selectively receive a first bare terminal end of a first one of said at least two remote optic fibers such that the first terminal ends of said pigtail optic fiber and said first one of said at least two remote optic fibers may substantially abut, and possessing at least one slot extending from the periphery of said body to said borehole;

(b) providing means for cleaning said borehole in the region of said at least one slot;

(c) cleaning said borehole in the region of said at least one slot utilizing said cleaning means;

(d) inserting the first bare terminal end of said first one of said at least two remote optic fibers into said borehole end adapted to receive said first bare terminal end of said first one of said at least two remote, optic fibers and substantially maintaining said first bare terminal end of said first one of said at least two remote optic fibers in a position substantially abutting the first bare terminal end of said pigtail optic fiber extending into said borehole in the region of said at least one slot;

(e) performing a test on the first one of said remote optic fibers with said optical device; and (f) retracting said first bare terminal end of said first one of said at least two remote optic fibers from said borehole end adapted to receive said first bare terminal end of said first one of said at least two remote optic fibers.

52. The method of claim 51 comprising the further steps of repeating steps (a)–(f) with a second one of said at least two remote optic fibers instead of said first one of said at least two remote optic fibers.

53. The method of claim 51 further comprising the further step of depositing through said slot and into said borehole a material selected from the group consisting of gel and liquid, said material having an index of refraction substantially equal to the index of refraction of the core portion of said pigtail optic fiber.

* * * * *